US012188877B2

United States Patent
Gan et al.

(10) Patent No.: US 12,188,877 B2
(45) Date of Patent: Jan. 7, 2025

(54) AUTOMATED OPTICAL DOUBLE-SIDED INSPECTION APPARATUS

(71) Applicant: FENG CHIA UNIVERSITY, Taichung (TW)

(72) Inventors: Yee Siang Gan, Taichung (TW);
Sze-Teng Liong, Taichung (TW);
Shih-Kai Fan, Taichung (TW);
Che-Ming Li, Taichung (TW);
Yu-Hsien Lin, Taichung (TW)

(73) Assignee: FENG CHIA UNIVERSITY, Taichung (TW)

(*) Notice: Subject to any disclaimer, the term of this patent is extended or adjusted under 35 U.S.C. 154(b) by 209 days.

(21) Appl. No.: 18/069,954

(22) Filed: Dec. 21, 2022

(65) Prior Publication Data

US 2023/0213457 A1 Jul. 6, 2023

(30) Foreign Application Priority Data

Jan. 4, 2022 (TW) .................. 111100174

(51) Int. Cl.
*G01N 21/88* (2006.01)
*G06T 7/00* (2017.01)

(52) U.S. Cl.
CPC ....... *G01N 21/8851* (2013.01); *G06T 7/0004* (2013.01); *G01N 2021/8841* (2013.01); *G01N 2021/888* (2013.01)

(58) Field of Classification Search
CPC ....... G01N 21/8851; G01N 2021/8841; G01N 2021/888; G01N 21/9501; G01N 21/8806; G06T 7/0004
See application file for complete search history.

(56) References Cited

U.S. PATENT DOCUMENTS

| 7,190,447 | B2* | 3/2007 | Meeks ............... G01B 11/065 356/237.4 |
| 10,156,527 | B2* | 12/2018 | Janik .................... G01N 21/94 |
| 2020/0043765 | A1* | 2/2020 | Huang ................. H04N 23/56 |

FOREIGN PATENT DOCUMENTS

| CN | 209250745 U | 8/2019 |
| TW | M616950 | 9/2021 |

* cited by examiner

*Primary Examiner* — Hung V Nguyen
(74) *Attorney, Agent, or Firm* — Guice Patents PLLC

(57) ABSTRACT

An automated optical double-sided inspection apparatus includes a first image-capturing portion, a second image-capturing portion, a platform, a first light-blocking portion, a second light-blocking portion, and a processing portion. The platform carries an external object. When the processing portion operates in a first capturing mode, the second light-blocking portion blocks visible light from passing therethrough, while the first light-blocking portion allows visible light to pass therethrough, so that the first image-capturing portion shoots a first side of the external object through the first light-blocking portion to obtain a first image. When the processing portion operates in a second capturing mode, the first light-blocking portion blocks visible light from passing therethrough, while the second light-blocking portion allows visible light to pass therethrough, so that the second image-capturing portion shoots a second side of the external object through the second light-blocking portion to obtain a second image.

6 Claims, 2 Drawing Sheets

AUTOMATED OPTICAL DOUBLE-SIDED INSPECTION APPARATUS

BACKGROUND OF THE INVENTION

1. Technical Field

The present invention relates to inspection technologies, and more particularly to an automated optical double-sided inspection apparatus.

2. Description of Related Art

The traditional defect inspection systems are unable to inspect two opposite sides of an object to be inspected. For double-sided inspection using such a known system, manual operation is required to overturn the object to be inspected after its one side has been captured so that its opposite side can be subsequently captured by cameras of the system. However, this manual overturning procedure is subject to human errors, leading to low inspection efficiency and inferior accuracy.

SUMMARY OF THE INVENTION

In view of this, the primary objective of the present invention is to provide an automated optical double-sided inspection apparatus, which automatically performs inspection on opposite sides of an inspection object, so as to overcome the problems of the prior art about manual intervention that is time-consuming and costly.

Another objective of the present invention is to provide an automated optical double-sided inspection apparatus, which employs light-blocking portions arranged at two opposite sides of an inspection object to eliminate clutter in the background of captured images, thereby reducing recognition errors, improving inspection performance, and providing the possibility of leaving out some image pre-processing procedures. In particular, a background-removing step that is known to be complicated and resource-consuming can be eliminated, so that the recognition speed of the system can be enhanced.

Hence, in order to achieve the foregoing objectives, the present invention provides an automated optical double-sided inspection apparatus, which comprises a first image-capturing portion, a second image-capturing portion, a platform, a first light-blocking portion, a second light-blocking portion, and a processing portion. The second image-capturing portion is separated from the first image-capturing portion. The platform is located between the first image-capturing portion and the second image-capturing portion is for carrying an external object. The external object has a first side and a second side opposite to each other. The first image-capturing portion has a shooting direction pointing to the first side of the external object, and the second image-capturing portion has a shooting direction pointing to the second side of the external object. The first light-blocking portion is located between the first image-capturing portion and the platform. The second light-blocking portion is located between the second image-capturing portion and the platform. The processing portion operates in a first capturing mode or a second capturing mode. When the processing portion operates in the first capturing mode, the second light-blocking portion blocks visible light from passing therethrough, while the first light-blocking portion allows visible light to pass therethrough, so that the first image-capturing portion captures the first side of the external object through the first light-blocking portion to obtain a first image. When the processing portion operates in the second capturing mode, the first light-blocking portion blocks visible light from passing therethrough, while the second light-blocking portion allows visible light to pass therethrough, so that the second image-capturing portion captures the second side of the external object through the second light-blocking portion to obtain a second image.

In one embodiment, the first image-capturing portion, the first light-blocking portion, the platform, the second light-blocking portion, and the second image-capturing portion are all located on an identical imaginary gravitational benchmark plumb line.

In one embodiment, for ensuring smooth operation of the present invention, the first light-blocking portion and the second light-blocking portion each comprise a respective electrochromic material. Specifically, the processing portion adjusts voltages applied to the first light-blocking portion and the second light-blocking portion in terms of magnitude, so as to make the first light-blocking portion and the second light-blocking portion enter or exit a light-transmitting state or a light-blocking state, respectively. The light-blocking portions, when in the light-transmitting state, allows visible light to pass therethrough, and when in the light-blocking state, blocks visible light from passing therethrough. In other words, the processing portion can have the first light-blocking portion and the second light-blocking portion vary in their optical properties related to light transmission vary fast through power switching.

In one embodiment, the present invention achieves inspection of defects throughout an object using the image recognition technology. Specifically, the present invention may further comprise an inspection portion, for extracting parts showing the external object from the first image and/or the second image, and inputting the parts to a predetermined training model where the parts are processed using machine learning algorithms, so as to obtain an inspection result.

In one embodiment, the training model is used to recognize whether the external object has any defect, and for any inspected defect, the inspection result contains information of details and a location of the defect.

DETAILED DESCRIPTION OF THE INVENTION

First, terms used throughout the specification shall have the following meanings.

As used herein, the term "algorithms" refers to programs capable of comparing and computing input data. These programs may be various applicable algorithms and devices for statistical analysis and artificial intelligence applications, such as regression analysis, the analytic hierarchy process, cluster analysis, neural network algorithms, genetic algorithms, machine learning algorithms, deep learning algorithms.

Figure 1:
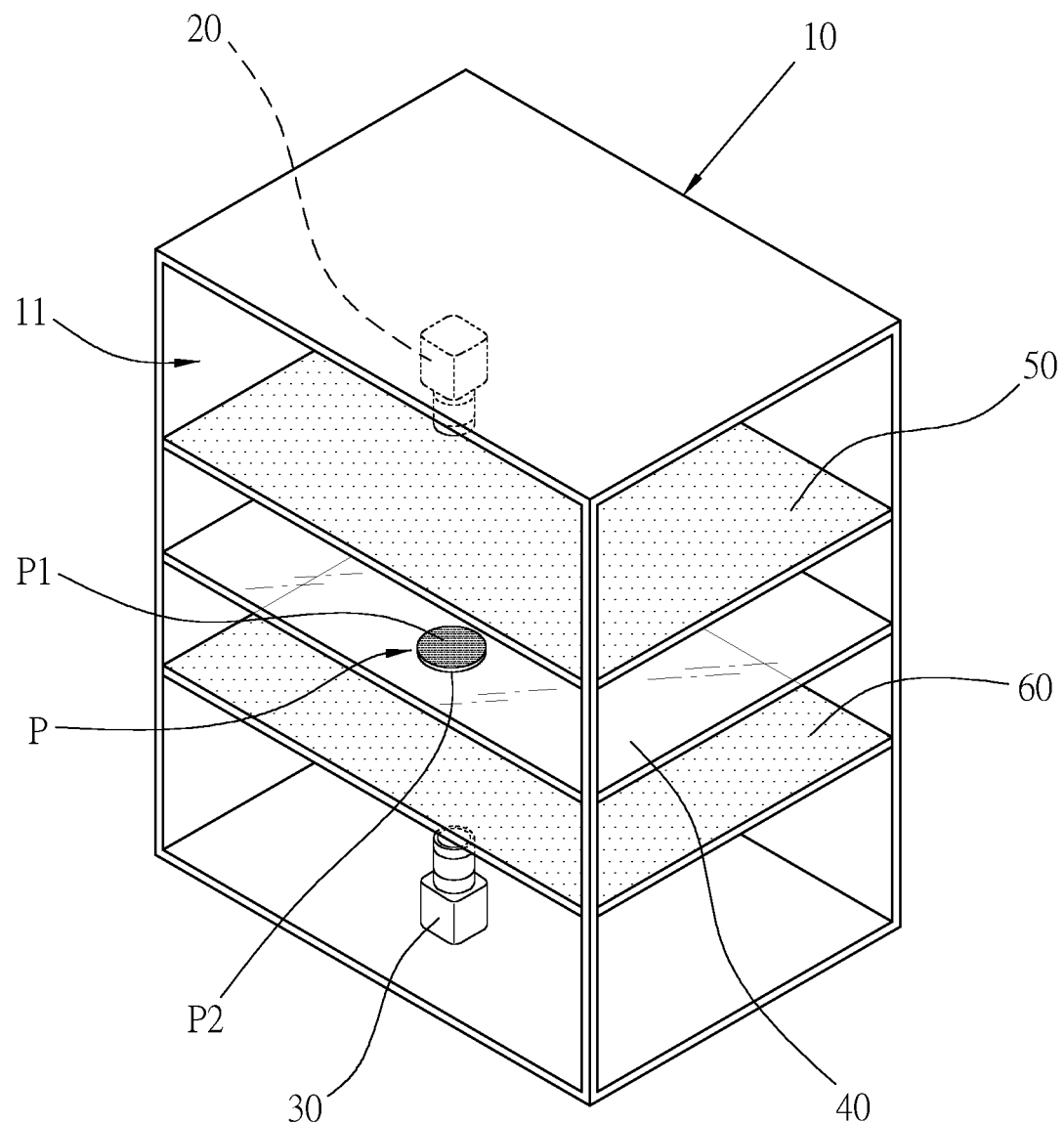
FIG. 1 is a perspective view of an automated optical double-sided inspection apparatus according to one preferred embodiment of the present invention.
Figure 2:
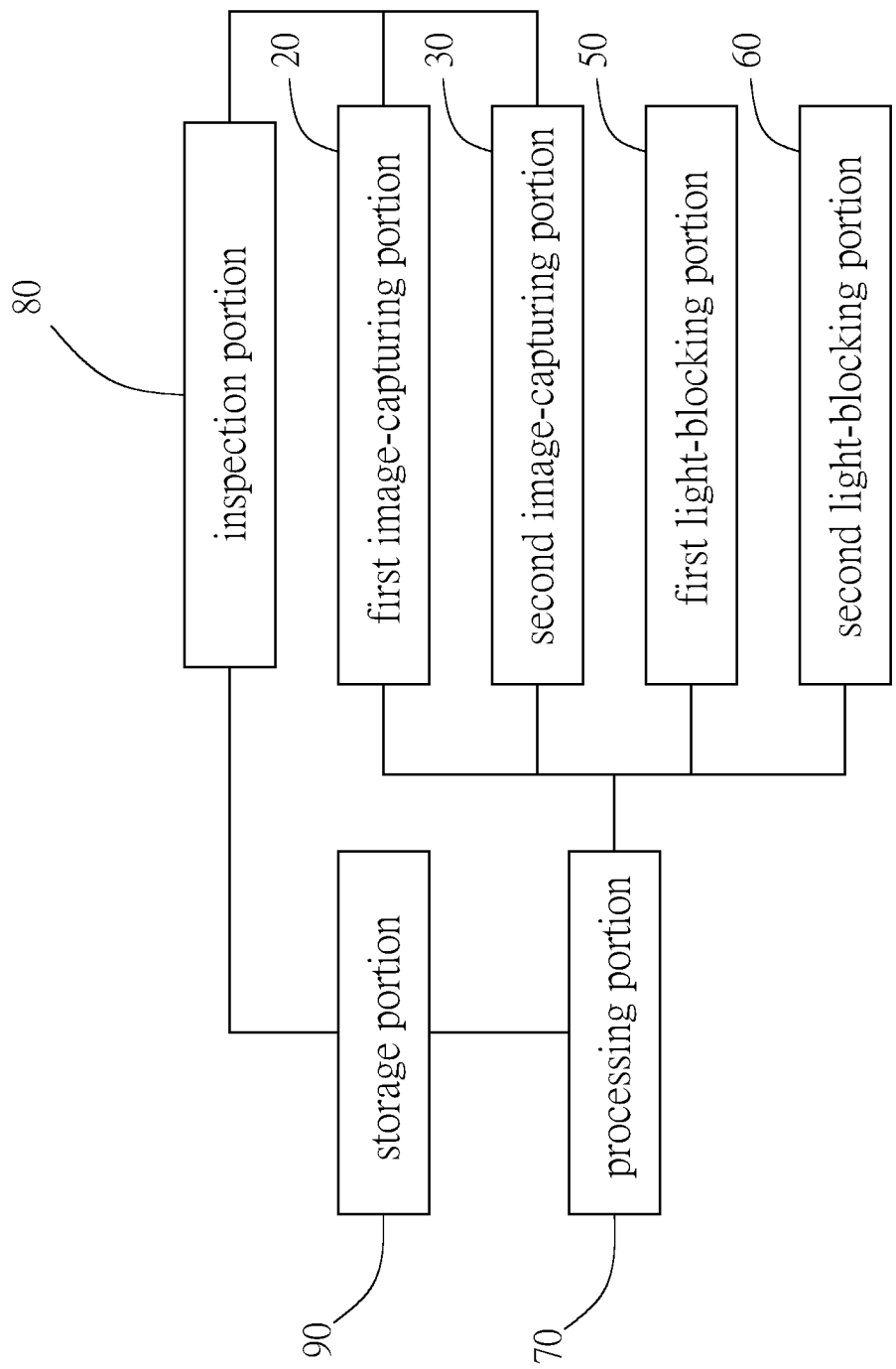
FIG. 2 is a system block diagram of an automated optical double-sided inspection apparatus according to the preferred embodiment of the present invention.

Then, referring to FIG. 1 and FIG. 2, in a preferred embodiment, the present invention provides an automated optical double-sided inspection apparatus, which is designed to inspect an external object P for defects. The external object P has a first side P1 and a second side P2 that are opposite to each other. For example, the external object P may be, but is not limited to, a wafer, a glass substrate, or a wheel rim, in particular a precision component.

Moreover, the automated optical double-sided inspection apparatus primarily comprises a housing 10, a first image-capturing portion 20, a second image-capturing portion 30, a platform 40, a first light-blocking portion 50, a second light-blocking portion 60, a processing portion 70, an inspection portion 80, and a storage portion 90. Therein, the first image-capturing portion 20, the second image-capturing portion 30, the first light-blocking portion 50, the second light-blocking portion 60, the processing portion 70, the inspection portion 80, and the storage portion 90 are in direct or indirect signal communication through wired or wireless media (e.g., 4G, 5G, Wi-Fi, Bluetooth, NFC, RFID, and the like).

The housing 10 defines therein an interior space for accommodating the first image-capturing portion 20, the first light-blocking portion 50, the platform 40, the second light-blocking portion 60, and the second image-capturing portion 30, so that the first image-capturing portion 20, the first light-blocking portion 50, the platform 40, the second light-blocking portion 60, and the second image-capturing portion 30 are arranged on an identical imaginary gravitational benchmark plumb line in order from top to bottom. These components are properly fixed to the housing 10 by any applicable means, such as screw fastening or inlay combination. As these are known in the art, detailed description is omitted herein for conciseness.

The first image-capturing portion 20 and the second image-capturing portion 30 may be a video camera, a camera, or an apparatus comprising a charge-coupled device (CCD) or a complementary metal-oxide-semiconductor (CMOS), respectively.

The platform 40 is a transparent stage that allows visible light to pass therethrough and is configured to carry the external object P. Furthermore, the housing 10 has at least one opening 11 provided at its one side, through which the external object P can be placed onto or taken off from the platform 40. Therein, the external object P may be moved by any conventional conveying device, such as a robot arm. As this are known in the art, detailed description is omitted herein for conciseness.

Moreover, the platform 40 is located between the first image-capturing portion 20 and the second image-capturing portion 30, so that the first image-capturing portion 20 has its shooting direction pointing to the first side P1 of the external object P, and the second image-capturing portion 30 has its shooting direction pointing to the second side P2 of the external object P.

The first light-blocking portion 50 and the second light-blocking portion 60 are each in the form of a plate, so that the two plates are parallel to each other and located between the platform 40 and the first image-capturing portion 20, and between the platform 40 and the second image-capturing portion 30. The first light-blocking portion 50 and the second light-blocking portion 60 each comprise an electrochromic material, voltages applied to the first light-blocking portion 50 and the second light-blocking portion 60 may be separately adjusted by the processing portion 70, so that the first light-blocking portion 50 and the second light-blocking portion 60 can be controlled to enter or exit a light-transmitting state or a light-blocking state, respectively. Therein, the light-blocking portions, when in the light-transmitting state, allows visible light to pass therethrough and when in the light-blocking state, blocks visible light from passing therethrough.

The processing portion 70 has one or more of a microprocessor, a central processing unit (CPU), a computing device, a microcontroller, a digital signal processor, a graphics processing unit (GPU), another device having computing functions or any combination thereof. The processing portion 70 is used to operate in a first capturing mode or a second capturing mode. Specifically, when the processing portion 70 operates in the first capturing mode, the second light-blocking portion 60 is in the light-blocking state and blocks visible light from passing therethrough. Meanwhile, the first light-blocking portion 50 is in the light-transmitting state and allows visible light to pass therethrough, so that the first image-capturing portion 20 can capture the first side P1 of the external object P through the first light-blocking portion 50 to obtain a first image. Since the first image-capturing portion 20 and the second light-blocking portion 60 are located at two opposite sides of the platform 40, and the second light-blocking portion 60 is in the light-blocking state where the second light-blocking portion 60 can at this time act as the background in the captured image, thereby preventing poor inspection performance caused by cluttered backgrounds (such as those containing lighting elements, cameras, wires, etc.). In addition, this helps to provide the possibility of leaving out some image pre-processing procedures, in particular a background-removing step that is known to be complicated and resource-consuming.

On the other hand, when the processing portion 70 operates in the second capturing mode, the first light-blocking portion 50 is in the light-blocking state and blocks visible light from passing therethrough, while the second light-blocking portion 60 is in the light-transmitting state to allow visible light to pass therethrough, so that the second image-capturing portion 30 can capture the second side P2 of the external object P through the second light-blocking portion 60 to obtain a second image. Similarly, since the second image-capturing portion 30 and the first light-blocking portion 50 are located at two opposite sides of the platform 40, and the first light-blocking portion 50 is in the light-blocking state, where the first light-blocking portion 50 can at this time act as the background in the captured image, thereby preventing poor inspection performance caused by cluttered backgrounds. In addition, this helps to provide the possibility of leaving out some image pre-processing procedures, in particular a background-removing step that is known to be complicated and resource-consuming.

Specially, the first capturing mode and the second capturing mode are such configured that they do not capture images at the same time, but operates successively with a predetermined interval therebetween. In particular, the first image-capturing portion 20 captures the first image first, and then the second image-capturing portion 30 captures the second image. In the present embodiment, the predetermined interval is 0.5 second.

The inspection portion 80 has one or more of a microprocessor, a central processing unit (CPU), a computing device, a microcontroller, a digital signal processor, a graphics processing unit (GPU), another device having computing functions or any combination thereof. The inspection portion 80 is used to extract parts showing the external object P form the first image and/or the second image, and input these parts to a predetermined training model where a defect inspection algorithm, such as YOLO (You Only Look Once), SegNet or U-Net is used to recognize whether the external object P has any defect, so as to obtain an inspection result. Therein, for any detected defect of the external object P, the inspection result contains information of details and a location of the defect. In other embodiments, the inspection portion 80 detects deckle edges and dimensions of the external object P in addition to defects.

Moreover, the training model can be then optimized in terms of algorithm and the related modules can be adjusted in terms of parameter according to the inspection result, so as to improve accuracy of defect recognition.

The storage portion 90 comprises one or more memory devices, each of which may be, but is not limited to, a read-only memory (ROM), a flash memory, a soft disk, a hard drive, an optical disk, a flash drive, a USB flash drive, a magnetic tape, a web-accessible database, or any storage medium having the same function and devisable to people of ordinary skill in the art. The storage portion 90 is used to store the training model, the first image, the second image, and the inspection result.

With the configuration described previously, the present invention can be easily implemented in an existing production line in a factory to effectively inspect objects produced and conveyed along the production line without adding or changing the established production process and production setting. Therein, the production line may be, but is not limited to, a semiconductor production line, a TFT-LCD production line, and a processing production line.

Moreover, in another embodiment, the processing portion 70, the inspection portion 80 and the storage portion 90 may be incorporated in an AI-based computing device of a NVIDIA® Jetson Nano™ development kit. As the device is more compact than traditional computers, the overall volume of the system can be reduced and the recognition speed can be enhanced.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. An automated optical double-sided inspection apparatus, for inspecting an external object, the external object having a first side and a second side opposite to each other, and the automated optical double-sided inspection apparatus comprising:
   a first image-capturing portion;
   a second image-capturing portion, separated from the first image-capturing portion;
   a platform, located between the first image-capturing portion and the second image-capturing portion, for carrying the external object, in which the first image-capturing portion having a shooting direction pointing to the first side of the external object, and the second image-capturing portion having a shooting direction pointing to the second side of the external object;
   a first light-blocking portion, located between the first image-capturing portion and the platform;
   a second light-blocking portion, located between the second image-capturing portion and the platform; and
   a processing portion, for operating in a first capturing mode or a second capturing mode;
   wherein, when the processing portion operates in the first capturing mode, the second light-blocking portion blocks visible light from passing therethrough, while the first light-blocking portion allows visible light to pass therethrough, so that the first image-capturing portion captures the first side of the external object through the first light-blocking portion to obtain a first image; and
   when the processing portion operates in the second capturing mode, the first light-blocking portion blocks visible light from passing therethrough, while the second light-blocking portion allows visible light to pass therethrough, so that the second image-capturing portion captures the second side of the external object through the second light-blocking portion to obtain a second image.

2. The automated optical double-sided inspection apparatus of claim 1, wherein the first image-capturing portion, the first light-blocking portion, the platform, the second light-blocking portion, and the second image-capturing portion are all located on an identical imaginary gravitational benchmark plumb line.

3. The automated optical double-sided inspection apparatus of claim 1, wherein the first light-blocking portion and the second light-blocking portion each comprise a respective electrochromic material.

4. The automated optical double-sided inspection apparatus of claim 3, wherein the processing portion adjusts voltages applied to the first light-blocking portion and the second light-blocking portion in terms of magnitude, respectively, so as to make the first light-blocking portion and the second light-blocking portion enter or exit a light-transmitting state or a light-blocking state, respectively, so that the light-blocking portions, when in the light-transmitting state, allows visible light to pass therethrough and when in the light-blocking state, blocks visible light from passing therethrough.

5. The automated optical double-sided inspection apparatus of claim 1, further comprising an inspection portion, which extracting parts showing the external object from the first image and/or the second image, and inputting the parts to a predetermined training model where the parts are processed using machine learning algorithms, so as to obtain an inspection result.

6. The automated optical double-sided inspection apparatus of claim 5, wherein the training model is used to recognize whether the external object has any defect, and for any inspected defect, the inspection result contains information of details and a location of the defect.

* * * * *